Figure 1:
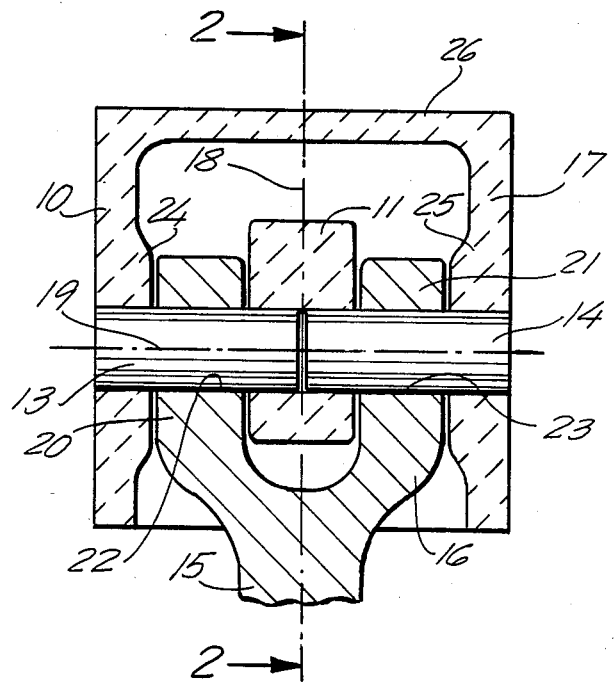

United States Patent [19]

Hüther

[11] Patent Number: 4,548,125
[45] Date of Patent: Oct. 22, 1985

[54] PISTON ARRANGEMENT, PARTICULARLY FOR AN INTERNAL COMBUSTION ENGINE

[75] Inventor: Werner Hüther, Karlsfeld, Fed. Rep. of Germany

[73] Assignee: MTU Motorn-und Turbinen Union GmbH, Munich, Fed. Rep. of Germany

[21] Appl. No.: 394,058

[22] Filed: Jul. 1, 1982

[51] Int. Cl.⁴ .............................................. F16J 1/14
[52] U.S. Cl. ...................................... 92/187; 92/212; 92/238; 123/193 P; 403/150
[58] Field of Search ......................... 92/187, 238, 212; 403/150, 151, 153, 154; 123/193 P

[56] References Cited

U.S. PATENT DOCUMENTS

| | | | |
|---|---|---|---|
| 1,784,291 | 12/1930 | Jardine | 92/238 X |
| 1,859,360 | 5/1932 | Freer | 403/150 X |
| 2,395,911 | 3/1946 | Schoenfeld | 92/238 |
| 2,791,991 | 5/1957 | Ickes | 123/193 P |
| 3,327,594 | 6/1967 | Hepworth | 92/238 X |
| 3,497,038 | 2/1970 | Schrader et al. | 92/248 X |
| 3,636,823 | 1/1972 | Lewis et al. | 92/187 |
| 4,343,229 | 8/1982 | Tsuzuki et al. | 92/212 |

FOREIGN PATENT DOCUMENTS

| | | | |
|---|---|---|---|
| 157510 | 1/1905 | Fed. Rep. of Germany | |
| 686883 | 4/1930 | France | 92/238 |
| 2421311 | 10/1979 | France | |
| 1032360 | 6/1966 | United Kingdom | 92/187 |

Primary Examiner—Edward K. Look
Attorney, Agent, or Firm—Alan H. Levine

[57] ABSTRACT

A piston arrangement including a hollow piston, a piston pin extending within the piston, an intermediate abutment within the piston supporting the pin between its ends, and a transmission member, e.g., a connecting rod, engaging the pin on each side of the intermediate abutment. The intermediate abutment may be supported by the circumferential wall of the piston, or by the piston head, and may be formed as one piece with the piston. The transmission member may have a forked end for engaging the piston pin, the intermediate abutment being between the arms of the fork. The piston pin may be two separate aligned pins each having an end located within the intermediate abutment. The piston, intermediate abutment, piston pin, and transmission member may all be formed of a ceramic material.

6 Claims, 2 Drawing Figures

PISTON ARRANGEMENT, PARTICULARLY FOR AN INTERNAL COMBUSTION ENGINE

This invention relates to a piston arrangement, and more particularly to that of an internal-combustion engine, having a piston pin or pins engaged by a transmission member.

The transmission member engaging the piston pin, which extends across the width of the piston, is a connecting rod (thrust rod, crank rod, drive rod) serving to convert or reverse the reciprocating movement of the piston into rotary movement, but it may also be a reciprocating piston rod. The problem area described below refers to a piston and connecting rod of an internal-combustion engine, but it generally applies also to a piston and other types of transmission members engaging the piston pin.

The ends of piston pins are generally fixedly engaged in the circumferential wall of the piston, or in internal lugs or bosses of the circumferential wall, while the end of the connecting rod is pivotally connected to the piston pin by means of a plain bearing. The disadvantages described below, however, arise also in other types of arrangements. The bearing comes under maximum load when, during the travel of the piston, the pressure in the combustion space is a maximum.

Such extreme load causes the piston pin to deflect and accordingly the bearing to be stressed unevenly. Under this condition, it is mainly the edges of the bearing, or the bearing edges of the connecting rod, which absorb the load. The pin deflection is one of the reasons for not augmenting the power of the engine. Excessive deflection causes the oil film to be squeezed out of the bearing, thereby inducing intolerably high wear.

It is a broad object of the present invention to eliminate or alleviate these disadvantages.

It is a particular object of the present invention to provide a piston arrangement wherein the piston pin is supported between its ends.

With this arrangement, the piston pin is supported not only at its ends, but also by at least one intermediate abutment. The lateral abutments and the intermediate abutment or abutments form part of the piston. The present invention eliminates the deflection of the piston pin, or keeps it within reasonable limits, so that augmentation of the engine power is not prevented on that count. The force to be transmitted is spread over two or more engagement areas or bearings of the transmission member or connecting rod to reduce the deflection of the piston pin and allow greater forces to act on the piston pin or on the bearings. The preferred arrangement is a single intermediate abutment, and a single, two-sided point of engagement of the connecting rod or similar member.

The intermediate abutment may be supported by the interior of the circumferential wall of the piston or the interior of the piston head. Supporting the intermediate abutment by the circumferential wall of the piston provides a greater advantage in that unlike the abutment supported by the piston head, it prevents additional flow of heat from the hot piston head to the bearing of the connecting rod or similar member or to the piston pin.

According to a feature of the invention, the end of the connecting rod or similar member has a forked shape, which is a simple construction, and preferably no more than two arms or prongs and a single abutment between them are provided. Alternatively, three arms can be used, with an intermediate abutment arranged between each two arms, i.e., two intermediate abutments, can be provided.

The piston, or is circumferential wall, and/or head may form, together with the intermediate abutment, a single piece.

Bearing or fitting provisions for the connecting rod or similar member can be achieved, where the piston pin is divided into at least two parts with the aid of at least one intermediate abutment for the piston pin. This provides an advantage in that manufacturing tolerances or deviations of the piston pin and/or the holes receiving it can be compensated more readily. Where the end of the connecting rod or similar member engages with the piston pin, therefore, a separate piston pin is provided for each separated engagement surface provided in that end.

The present invention is applicable to pistons, piston pins, and connecting rods or similar members equally in metal and in ceramic versions of such parts, and the intermediate abutment can also be ceramic. The present invention provides special benefits when ceramic materials are used, preferably silicon nitride $Si_3N_4$ or silicon carbide $SiC$, for the reason that such materials are particularly sensitive to the maximum stresses which occur at the bearing edges. However, these maximum stresses and reactions thereto are alleviated by the present invention because it reduces the deflection of the piston pin. When use is made of ceramic materials for the parts of the present invention, it is desirable to use two aligned piston pins. The reason is that if the piston pin remains undivided, the various separate bearings may conceivably not all carry the load imposed, for ceramic materials have a greater modulus of elasticity than metals, so that the manufacturing tolerances or deviations are more difficult to compensate with undivided piston pins than with divided piston pins.

Figure 2:
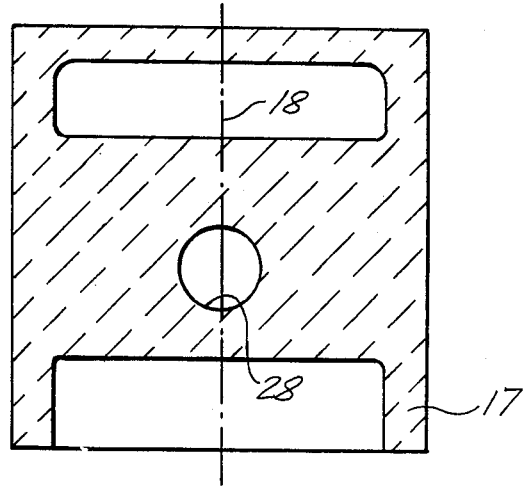

Further objects and advantages of the invention will be apparent from the following description. The accompanying drawings illustrate an illustrative embodiment of the present invention. In the drawings:

FIG. 1 is an axial cross-sectional view of a piston and piston pin according to the invention; and FIG. 2 is a cross-sectional view taken along line 2—2 of FIG. 1, the connecting rod being omitted.

The invention comprises a cylindrical piston 10 having an intermediate abutment 11, which may have the shape of a planar wall, two separate piston pins 13 and 14, and a connecting rod 15, part of which is broken-away for clarity. Only the piston end 16 of the connecting rod 15 is shown. The wall, or intermediate abutment, 11 extends diametrically from one side to the other of the circumferential wall 17 of piston 10. The abutment is carried by the circumferential wall 17, and in FIG. 2, it extends to the plane of projection, i.e., the plane of section 2—2.

The two pins 13 and 14 are in line with each other and extend perpendicularly through the intermediate abutment 11, i.e., through a hole 28 therein. Pins 13 and 14 are perpendicular to the piston centerline 18, the centerline 19 of the piston pins intersecting the piston centerline 18. Each of the piston pins 13 or 14 is fixedly carried in the circumferential wall 17, or in an internal bore 24 or 25 reinforcing it, and is fixedly carried in the intermediate abutment 11, which supports it at a point adjacent to the piston centerline 18.

The end 16 of the connecting rod is forked to form two arms 20 and 21. Each arm has a bearing bore 22 or 23 to receive its respective pin 13 or 14. Two separate connecting rod bearings may be arranged side-by-side, within bores 22 and 23, along the centerline of the piston pin and symmetrically to the plane of section 2—2. The connecting rod 15 is arranged for pivotal movement about the piston pins 13 and 14 via the arms 20 and 21 of its end 16. Alternatively, an intermediate abutment for the separate pins 13 and 14 is provided alone or in addition to the intermediate abutment 11, such abutment being supported by the head 26 of the piston 10, and extending in the plane of section 2—2.

In any case, the place of the two separate piston pins 13 and 14 can, if desired, be taken by a single, continuous piston pin. The piston 10, together with the intermediate abutment 11, is formed as a single piece. With respect to the separate pins 13 and 14, the single continuous piston pin can be considered split, in the plane of section 2—2, into two separate pins 13 and 14 at a point located within the intermediate abutment 11 or within the hole 28 thereof.

This invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A piston arrangement for an internal combustion engine, comprising:

a hollow piston having a circumferential wall, support means at opposite sides of the piston wall for supporting an end of a piston pin, an intermediate abutment within the piston, the piston and the intermediate abutment being formed as a single piece of ceramic material, an opening extending completely through the intermediate abutment, the opening being spaced from each of the support means and being aligned with both support means, two axially aligned piston pins made of ceramic material, each pin having one end supported within one of the support means and the other end supported within the opening in the intermediate abutment adjacent to the centerline of the piston, and a piston rod having an end formed with means for engaging the two pins.

2. A piston arrangement as defined in claim 1, wherein the piston rod has a forked end, the arms of the fork engaging the two piston pins at opposite sides of the intermediate abutment.

3. A piston arrangement as defined in claim 1, where the piston, the piston pins, the intermediate abutment, and the piston rod are all made of ceramic material.

4. A piston arrangement as defined in claim 1 wherein the piston rod is made of ceramic material.

5. A piston arrangement as defined in claim 4 wherein the ceramic material is selected from the group consisting of $Si_3N_4$ and SiC.

6. The piston arrangement as defined in claim 1 wherein the ceramic material is selected from the group consisting of $Si_3N_4$ and SiC.

* * * * *